Patented Jan. 2, 1934

1,941,609

UNITED STATES PATENT OFFICE 1,941,609

PROCESS FOR DECOMPOSING ORES

George A. Macready, Los Angeles, Calif.

No Drawing. Application July 7, 1931
Serial No. 549,335

7 Claims. (Cl. 23—134)

My invention relates to a process for decomposing ores by means of sulphur bearing vapors and the separation of the various elements composing the ore by vaporization, gravity settling and condensation of their sulphur compounds.

An object of my invention is to promote the chemical reactions by transporting the ore charge in a turbulent rapidly flowing stream of hot vapor so that an intimate mixture occurs.

An object of my invention includes carrying on the chemical reactions in a chamber or passage lined with barium sulphide or other refractory substance which is not attacked by hot carbon disulphide or sulphur bearing vapors in the presence of carbon.

An object of my invention is a novel refractory sulphur resistant composition for lining a reaction chamber consisting of barium sulphide and a binder.

My invention is particularly adaptable to the decomposition of aluminum ores, such as clay or bauxite or feldspar, for the purpose of forming aluminum sulphides which can be decomposed by electrolysis to yield metallic aluminum. It can also be used for other ores for concentration of the heavy metals such as gold, silver, lead, copper, mercury, zinc and others: for the recovery of potash, soda or magnesia compounds: for the manufacture of silica, sulphuric acid and carbon disulphide: and for the separation of complex ores into a number of pay constituents.

The raw materials required for my process are: ore, which should preferably be dried and crushed or pulverized to facilitate rapid chemical reaction: carbon, such as coke or coal or charcoal, also dried and crushed or pulverized: sulphur, for carbon disulphide: fuel, preferably fuel gas or oil: and electric power for the subsequent electrolysis of the products and for operation of machinery.

The chemical reactions are carried on in an elongated reaction passage or chamber which can be constructed in a variety of forms. The heated portions of the passage should be lined internally with barium sulphide or other refractory sulphide. Air and moisture should be excluded from the reaction passage to avoid oxidation.

The reaction passage is heated to a temperature between 500 and 1700 degrees centigrade according to the requirements of the ore treated and the separation products desired. Carbon disulphide is fed continuously into the intake end of the passage and is vaporized by heat. The quantity fed should be sufficient to create a vapor velocity capable of transporting the pulverized ore through the passage in mechanical suspension. Ore, preferably dried, pulverized and preheated, is fed into the swiftly moving current of vapor. Most ores, such as aluminum or silicate ores, should be intimately mixed with pulverized carbon and the mixture fed into the vapor. Or the carbon and ore can be mixed by the turbulent vapor current.

The finely divided ore charge is mechanically transported through the passage by the turbulent rapidly flowing current of carbon disulphide and sulphur vapors in a manner similar to the action of pneumatic dust or sawdust conveyors during which the ore and vapor are in hot intimate mixture and chemical action is promoted. The chemical reactions and products created during this stage of the process are many, varied and complex.

The element aluminum forms a large proportion of many rocks and ores being as high as 53% of alumina and 20% of kaolin. At present price of 22 cents per pound for aluminum the values of the aluminum content per ton of the last two materials are $233 and $88 respectively. My process is particularly adapted to recovery of aluminum.

It has been known for many years that aluminum silicates, such as clay, can be decomposed if intimately mixed with carbon and heated at a red heat in a current of carbon disulphide vapor. As far as applicant is aware no continuous process has been evolved for taking advantage of this reaction and it has been difficult to utilize the reaction for large quantities because containers have been subject to attack by the corrosive sulphur bearing vapors. Applicant's invention of carrying out the reactions in a passage or chamber lined with barium sulphide and of utilizing a vapor current at high velocity to transport and mix the constituents enables the reaction to be accomplished continuously and with large quantities.

Among the many, varied and complex products of the reaction the following may be mentioned:

In ores containing aluminum, aluminum sulphide is an important product and since it volatilizes around 1200 degrees centigrade it forms a part of the vapor if temperature is greater.

Silicon also forms a large proportion of most ores and takes part in the reaction to form silicon sulphide which is volatile at high temperatures.

Oxygen forms nearly half of many ores and rocks in the form of oxides or silicates. Oxygen has a great affinity for both sulphur and carbon so that carbon monoxide and sulphur dioxide gases are important products of the reaction.

In the sulphurous reducing atmosphere of the reaction passage metallic elements such as lead, copper, zinc, iron, sodium, potassium, calcium, barium, magnesium and others form sulphides when the oxygen has been detached from them by its combination with carbon or sulphur. Some of these sulphides are volatile and some are not and some of the above elements remain undecomposed in the ore.

In addition to the above products double sulphides, sulpho-silicates, complex compounds, partially decomposed substances and other compounds also result. Most of these are undesirable and careful attention to each individual ore is necessary to maintain the undesirable products at a minimum.

At the conclusion of the first stage of applicant's process the reaction passage or chamber contains a rapidly flowing turbulent vapor current of complex composition containing carbon disulphide, sulphur, sulphur dioxide, carbon monoxide, aluminum sulphide (if temperature is sufficient), silicon sulphide (if temperature is sufficient) and other vapor compounds mechanically transporting solid or liquid particles of carbon, undecomposed ore, unvaporized sulphides, perhaps precious metals, and other solids and liquids. Some ores require a temperature as high as 1700 degrees centigrade while others can be treated at a much lower temperature.

The next step in my process is to decrease the velocity of the vapor current for the purpose of settling out the unvaporized solids and liquids by gravity. This is accomplished by increasing the cross section of the passage while maintaining the temperature at the previous high level. The solids and liquids mentioned in the preceding paragraph settle out by gravity to form a concentrate which is diluted by carbon and undecomposed ore. The concentrated settlings can be treated by ordinary metallurgical processes if of sufficient value.

Oxygen, which commonly forms half of siliceous ores, remains mostly in the vapor as carbon monoxide and sulphur dioxide. Silicon and aluminum, which frequently form 40% or more of an ore, remain mostly in the vapor as sulphides if the vapor temperature is around 1700 degrees centigrade. The remaining constituents (10% more or less) vary with the ore and are partly vaporized and partly solid.

After settling the non-volatile materials from the vapor the subsequent steps of my process depend on cooling the vapor with an accurate and careful control of the temperature. The various sulphides and sulphur compounds condense at different temperatures.

The vapors are allowed to flow through the passage and gradually cool so that each compound is deposited at the specific temperature locality of the passage corresponding to its condensation temperature. The temperatures of various portions of the passage are maintained constant so that a uniform product is obtained for each temperature locality. The result is a remarkably accurate separation of the various compounds. Doors or ports may be provided for removal of each product as it accumulates so that the process can be continuous. Each product can be treated or discarded according to its character and market conditions.

Among the most important condensed sulphides are aluminum sulphides as a source of metallic aluminum. Among the numerous aluminum salts the sulphide is one of the most economically decomposed by electrolysis since it requires only about one third the voltage of the other salts. Its commercial use has heretofore been impractical because of expense of preparation.

Sulphides of heavy metals can be treated for recovery of each metal. Potassium sulphide is of value for fertilizer and chemicals. Sulphides of sodium, magnesium, lithium and others are of value for chemicals or as sources of the metallic elements. Some of the products are of negligible value.

Silicon sulphide which forms a large portion of the product from some ores has a limited market but it can be treated for the recovery of sulphur and high grade silica.

Condensed carbon disulphide and sulphur can be used again in the process.

The uncondensed gases (at atmospheric temperature) consist principally of carbon monoxide and sulphur dioxide and have some fuel value. They can also be treated for recovery of sulphur or manufacture of sulphuric acid according to composition and market conditions. Other more complex products are also segregated which can be treated as demanded by their composition.

Numerous forms of apparatus can be used for the process. For example: the passage can be a series of vertical tubes: or it can be a long horizontal or inclined passage: or revolving tubes can be used: or it can be one or more chambers provided with baffles.

The apparatus preferred by applicant is a series of tall vertical tubes connected to form a continuous passage with proper temperature control of each tube. The first tube can be heated and the charges fed into the bottom and blown upwardly. Vapor and solids can be separated in the next tubes and the following tubes used for condensation. Products can be drawn off at the bottom of each tube. The heated tubes can be enclosed in a fire box and the condenser tubes in suitable jackets. The portions of the apparatus subjected to high temperatures can be made of suitable refractories of which several are available on the market.

A novel feature of my process is the use of a lining of barium sulphide or other refractory sulphide on the interior walls of the passage where subjected to hot sulphur bearing vapors. Clay bricks are not satisfactory because of being attacked by carbon disulphide in the presence of carbon at high temperatures.

The composition forming the lining is made by mixing pulverized barium sulphide with a binder such as petroleum or asphalt in proportions such as to make a stiff "dough" which can be moulded to desired shapes such as tubes. By heating above a red heat the asphalt or petroleum is coked to form a hard binder. Moulding under pressure improves the quality.

The composition has not great strength and oxidizes in the air. It occupies a protected position on the interior of the reaction passage where air is excluded and where the surrounding walls provide strength.

It will readily be seen that my process provides an economical means for producing aluminum sulphide from which metallic aluminum can be produced at very low cost. My process is continuous and raw materials, clay, carbon, sulphur, fuel and electricity are not excessively expensive when compared to production costs for pig iron which requires, iron ore, carbon, limestone and fuel. In most structures metals are proportioned by volume not by weight: aluminum is only one third as heavy as iron so that where volume is the standard of comparison aluminum is worth three times the price per unit weight as iron.

My process is also valuable for the reduction of ores containing several pay constituents which are difficult to separate by other methods. It completely separates some ores to such a degree that several elements can be produced which would be ignored by other methods.

I claim as my invention:

1. A process for decomposing ores consisting of continuously feeding ore, carbon and carbon disulphide into a passage lined with a refractory sulphide and heated to a temperature between 500 and 1700 degrees centigrade adjacent the intake end, separating solid and vapor products by gravity, and separating the constituents of the resulting vapor by condensation at a reduced temperature.

2. A process for decomposing aluminum ores consisting of continuously feeding ore, carbon and carbon disulphide into a passage lined with a refractory sulphide and heated to a temperature above 500 degrees centigrade, separating solid from vapor products by gravity, and separating aluminum sulphide from the resulting vapor by condensation at a reduced temperature.

3. A process for decomposing ores consisting of continuously feeding ore and carbon into a rapidly flowing current of carbon disulphide vapor, transporting said ore and carbon by said current of vapor for a sufficient length of time to cause the ore and vapor to react chemically, decreasing the velocity of the vapor current to cause unvaporized material to separate from the vapor by gravity, the temperature of the ore, vapor and products being maintained above 500 degrees centigrade during the aforementioned steps, and separating the constituents of the vapor by condensation at gradually reducing vapor temperature, the heated vapor being conducted through a passage lined with a refractory sulphide.

4. A process for decomposing ores which consists of blowing a charge of ore in mechanical suspension in a current of hot carbon disulphide vapor through a heated passage from which air is excluded to promote chemical action between said ore and vapor and separating the resulting products by gravity and temperature control.

5. A process for decomposing ores which consists of feeding a charge of ore and carbon into a swiftly flowing current of hot carbon disulphide vapor in which said charge is transported in mechanical suspension through an elongated heated passage from which air is excluded for a sufficient length of time to thoroughly agitate and mix vapor with charge to insure chemical reaction, conducting the mixture through a continuation of said passage having an increased cross section area wherein the vapor velocity is reduced and solids precipitated from the vapor by gravity, conducting the separated vapor through an additional continuation of said passage wherein the vapor is cooled, and isolating products condensed from the cooling vapor by collecting said products at different temperature localities along said passage.

6. A process for treating aluminum ore which consists of feeding a charge of ore and carbon into swiftly flowing current of hot carbon disulphide vapor in which said charge is transported in mechanical suspension through an elongated heated passage from which air is excluded for a sufficient length of time to thoroughly agitate and mix vapor with charge to insure chemical reaction, conducting the mixture through a continuation of said passage having an increased cross section wherein the vapor velocity is reduced and solids precipitated from the vapor by gravity, conducting the separated vapor through an additional continuation of said passage wherein the vapor is cooled, and isolating aluminum sulphide from other products condensed from the cooling vapor by collecting said products at different temperature localities along said passage.

7. A process for decomposing ores which consists of blowing a charge of ore in mechanical suspension in a current of hot carbon disulphide vapor through a heated passage from which air is excluded to promote chemical action between said ore and vapor and separating the resulting products by gravity and temperature control, the interior wall of said heated passage being lined with a protective covering of a refractory sulphide.

GEORGE A. MACREADY.